(12) United States Patent
Tessitore et al.

(10) Patent No.: US 8,220,597 B2
(45) Date of Patent: Jul. 17, 2012

(54) PARKING BRAKE OF A DRUM BRAKE

(75) Inventors: Luigi Tessitore, Savona (IT); Adriano Girini, Cairo Montenotte (IT); David Peasley, Balsall Common (GB)

(73) Assignee: Automotive Products Italia (SV) s.r.l. (IT)

( * ) Notice: Subject to any disclaimer, the term of this patent is extended or adjusted under 35 U.S.C. 154(b) by 522 days.

(21) Appl. No.: 10/527,622

(22) PCT Filed: Sep. 8, 2003

(86) PCT No.: PCT/GB03/03912
§ 371 (c)(1),
(2), (4) Date: Nov. 27, 2005

(87) PCT Pub. No.: WO2004/025132
PCT Pub. Date: Mar. 25, 2004

(65) Prior Publication Data
US 2006/0144658 A1    Jul. 6, 2006

(30) Foreign Application Priority Data

| Sep. 11, 2002 | (GB) | 0221018.5 |
| Sep. 11, 2002 | (GB) | 0221019.3 |
| Oct. 14, 2002 | (GB) | 0223797.2 |
| Dec. 14, 2002 | (GB) | 0229169.9 |
| May 3, 2003 | (GB) | 0310296.9 |

(51) Int. Cl.
*F16D 65/44* (2006.01)
*F16D 51/22* (2006.01)
(52) U.S. Cl. .................. 188/79.57; 188/79.51

(58) Field of Classification Search ............ 188/79.57, 188/79.58, 79.59, 79.6, 79.61, 79.51, 79.53, 188/79.54, 79.55, 79.56
See application file for complete search history.

(56) References Cited

U.S. PATENT DOCUMENTS 2,322,061 A * 6/1943 Schnell ............... 188/79.53
4,232,766 A * 11/1980 Rupprecht ........... 188/79.54
(Continued)

FOREIGN PATENT DOCUMENTS

FR         2727732 A1 *  6/1996
(Continued)

*Primary Examiner* — Thomas J Williams
(74) *Attorney, Agent, or Firm* — RatnerPrestia

(57) ABSTRACT

A parking brake (10) having a drum containing first and second brake shoe portions (11, 12), a handbrake lever (18) pivoted (19) adjacent one end on one (11) of the brake shoe portions and a strut (20) extending between a first abutment on the handbrake lever and a second abutment (21) on the other (12) of the brake shoe portions. Pivoting of the handbrake lever relative to said one brake shoe portion (11) moves the strut (20) which in turn moves the other brake shoe portion (12) away from said one brake shoe portion to bring the shoe portions into contact with the drum thus applying the parking brake. One of the abutments is in the form of a biased wedging means (21) which acts on the strut (20) to take up all play in the thrust path between the handbrake lever (18) and the other brake shoe portion (12) via the strut. A clamping member (27) is provided for disabling the wedging means (21) from operating except when initial manufacturing or assembly clearances are being taken up in the strut or when a subsequent manual adjustment of shoe clearance is being made. Alternative snail-cam type wedging means (21) are also disclosed as in an electrically actuated parking brake system with an automatic clearance adjustment device.

10 Claims, 19 Drawing Sheets

U.S. PATENT DOCUMENTS

| | | | | |
|---|---|---|---|---|
| 4,375,251 A | * | 3/1983 | Burke et al. | 188/79.54 |
| 4,385,681 A | * | 5/1983 | Conrad et al. | 188/79.52 |
| 4,398,623 A | * | 8/1983 | Osborne | 188/79.54 |
| 4,854,423 A | * | 8/1989 | Evans et al. | 188/70 R |
| 5,590,744 A | * | 1/1997 | Belmond | 188/265 |
| 5,855,255 A | * | 1/1999 | Bock et al. | 188/162 |

FOREIGN PATENT DOCUMENTS

| | | | |
|---|---|---|---|
| JP | 58091939 A | * | 6/1983 |
| WO | WO 9221542 A1 | * | 12/1992 |
| WO | WO 9411648 A1 | * | 5/1994 |

* cited by examiner

PARKING BRAKE OF A DRUM BRAKE

This invention relates to parking brakes and in particular to parking brakes hereinafter referred to as of the type described which comprise a drum containing first and second brake shoe portions, a handbrake lever pivoted adjacent one end on one of the brake shoe portions, and a strut extending between a first abutment on the handbrake lever and a second abutment on the other of the brake shoe portions so that pivoting of the handbrake lever relative to said one brake shoe portion moves the strut which in turn moves the other brake shoe portion away from said one brake shoe portion to bring the shoe portions into contact with the drum and thus apply the parking brake. The brake shoe portions may be provided by separate brake shoes as in a normal twin shoe brake or by opposite end portions of a single shoe brake of the form disclosed in, for example, EP392829 or WO99/53212.

Parking brakes of the type described are well known and work efficiently particularly when they are actuated manually by a conventional driver operated lever. There is, however, an increasing requirement to provide parking brakes which are capable of electric motor application in order to dispense with the conventional manually operated lever.

One problem associated with electric motor actuated parking brakes is that the actuation system often has a relatively limited movement capability and this can therefore provide difficulties in ensuring efficient and sufficiently long lived actuation of the parking brake function when teamed with a parking brake of the type described which includes significant inherent lost motion in its actuation linkage.

It is an object of the present invention to provide a parking brake of the type described which is suitable for electrical actuation.

Thus according to the present invention there is provided a parking brake of the type described in which one of the abutments comprises a biased wedging means which acts on the strut to take up all play in the thrust path between the handbrake lever and the other brake shoe portion via the strut, means being provided for disabling the wedging means from operating except when initial manufacturing or assembly clearance are being taken up in the strut or when a subsequent manual adjustment of shoe clearances is being made.

Such an arrangement with its biased wedging means can significantly reduce the lost motion in the parking brake actuating linkage due to manufacturing, assembly and adjustment clearances between the strut and the first and second abutments and can also compensate for wear (due, for example, to Brinelling) of these components resulting from the high loads imposed on these components. Also the provision of the disabling means overcomes problems which can arise with such parking brakes if, when the parking brake is released, the brake shoes remain stuck to the drum due to stiction since the wedging means will operate thus adjusting the effective length of the strut into too long a condition and preventing subsequent full release of the shoe portions from the drum even if the stiction effect is overcome.

The means for disabling the wedging means may comprise, for example, a releasable clamping means which prevents movement of the biased wedge means relative to the co-operating abutment.

Typically the second abutment comprises a biased sliding wedge. One edge of such a wedge may slide along a plate secured to the web of the other braking shoe portion, a further edge of the wedge sliding along a further abutment surface on the strut. Preferably the further abutment surface on the strut comprises the root of a forked end portion of the strut, the forked end having two prongs which extend on opposite sides of a web of the other brake shoe portion.

Alternatively, the wedge means may comprise a cam rotationally biased against one end of the strut by spring means.

In such arrangements the clamping means may comprise a clamping plate which is drawn down onto the biased wedge or cam by a screw or bolt to clamp the wedge or cam to the web of the other brake shoe portion to prevent adjustment of the clearances.

Where the invention is applied to a twin shoe brake, the ends of the brake shoes remote from the strut may pivot on a fixed reaction abutment or on a manual or automatic wear adjustment device positioned between the ends of the shoes. For example, where an automatic wear adjustment device is used, the position of the shoes may be adjusted automatically to compensate for wear when a given amount of movement of the hand brake lever occurs before the brake is applied.

The invention also provides a parking brake system comprising an electrical actuator, a parking brake of the form described above, and linkage means connecting the actuator to the parking brake.

The invention further provides a parking brake system comprising a drum-type parking brake, an electrical parking brake actuator for applying the parking brake, an actuating mechanism connecting the actuator to the parking brake, and an automatic parking brake clearance adjustment device actuated when the movement of the actuating mechanism required to apply the parking brake exceeds a predetermined distance.

In such a system the parking brake may have first and second brake shoe portions and in which the actuating mechanism comprises a handbrake lever pivoted adjacent one end of the shoe portions, and a strut extending between a first abutment on the handbrake lever and a second abutment on the other brake shoe portion so that pivoting of the handbrake lever relative to said one brake shoe portion moves the strut which in turn moves the other brake shoe portion away from said one brake shoe portion to bring the shoe portions into contact with a brake drum and thus apply the parking brake, the automatic adjustment device being provided between the ends of the shoes remote from the strut, and the adjustment device being actuated by pivoting movement of the handbrake lever relative to said one shoe portion beyond a predetermined distance to increase the effective length of the adjustment device thus moving the ends of the shoe portions apart to compensate for wear of the shoe portions.

In an alternative arrangement the parking brake may have first and second brake shoe portions and in which the actuating mechanism comprises a first lever having a first contact zone adapted to engage a portion of the first brake shoe portion, said first lever being pivotally connected with a second lever, the second lever having a second contact zone adapted to engage a portion of the second brake shoe portion, pivoting of the first lever relative to the second lever being arranged to increase the effective length of the mechanism between the contact zones thus moving the associated brake shoe portions apart to engage the parking brake, the automatic adjustment device being actuated by movement of one of the levers beyond a predetermined distance to increase the effective length of the adjustment device thus compensating for wear of the shoe portions In an alternative arrangement the parking brake may have a pair of shoes and the actuating mechanism may comprise a first lever having a first contact zone adapted to engage a portion of a first brake shoe, said first lever being pivotally connected with a second lever, the second lever having a second contact zone adapted to engage a portion of a second brake shoe, pivoting of the first lever relative to the second lever being arranged to increase the effective length of the mechanism between the contact zones thus moving the associated brake shoe portions apart to engage the parking brake, the automatic adjustment device being actuated by movement of one of the levers beyond a predetermined distance to increase the effective length of the adjustment device thus compensating for wear of the shoes.

The first and second brake shoe portions may be provided by separate brake shoes or by appropriate end portions of a single generally U-shaped brake shoe.

Several embodiments of the different aspects of the present invention will now be described, by way of example only, with reference to the accompanying drawings in which.

Figure 1:
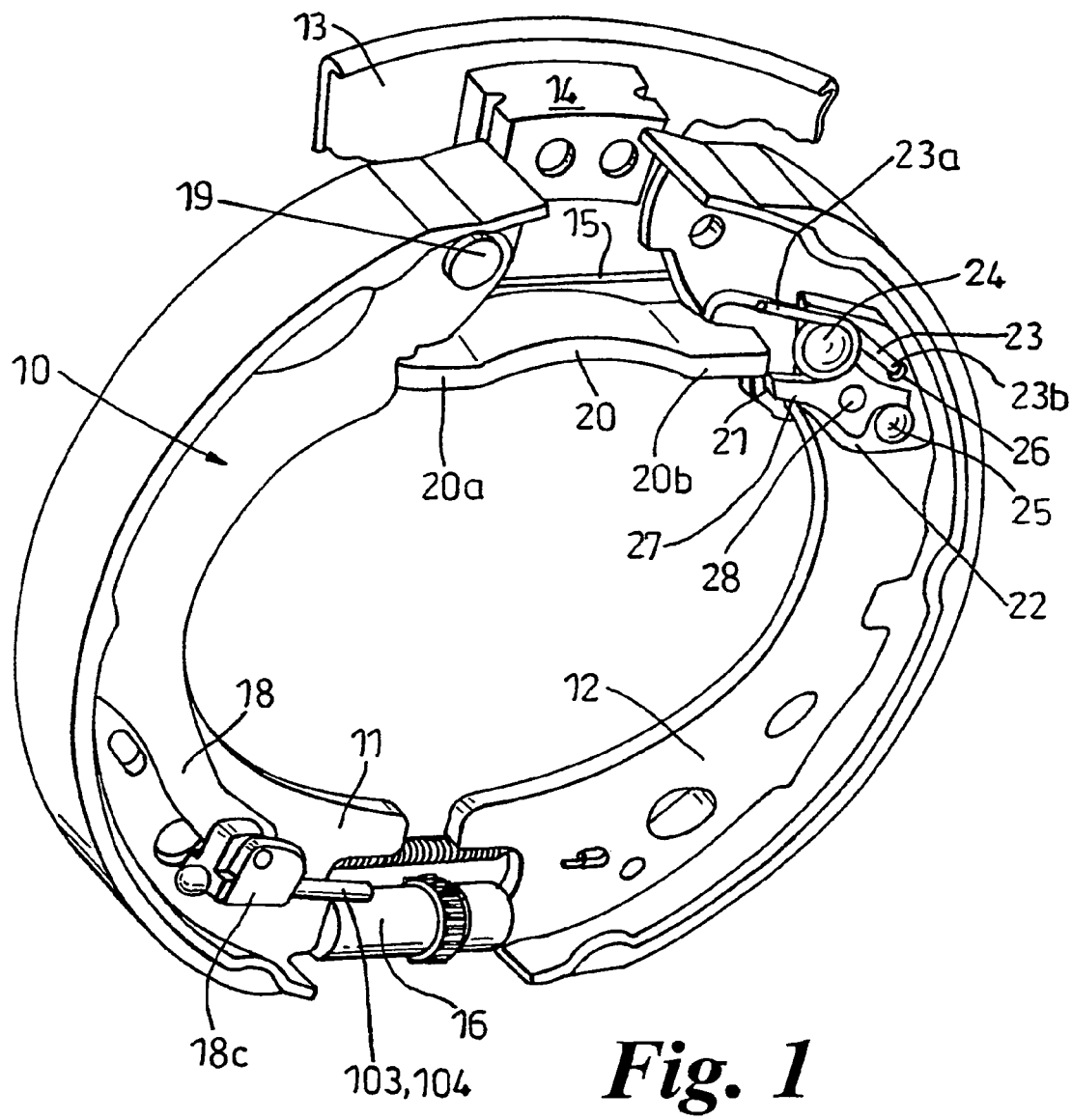
FIG. 1 shows a perspective view of part of a twin shoe parking brake in accordance with the present invention.

Referring to the drawings this shows part of a twin shoe parking brake 10 for use in a so-called drum in disc brake in which a pair of shoes 11 and 12 are mounted on a backplate 13. The upper ends of the shoes are pulled against a fixed backplate mounted abutment 14 (or against a separate abutment on the adjacent vehicle suspension) by a return spring 15 and the other ends of the shoes pivot on a wear adjustment device shown at 16 in FIG. 1. This wear adjustment device may be manually adjusted (as shown) or automatically adjusted, as will be described below, in which the position of the shoes is adjusted automatically to compensate for wear when a given amount of movement of the hand brake lever occurs before the brake is applied.

The shoes are contained within a drum (not shown) and the shoes are arranged to be brought into contact with the drum by an actuating mechanism which comprises a handbrake lever 18 which is pivoted adjacent one end by pin 19 on brake shoe 11. A strut 20 which has forked ends 20a and 20b acts between a first abutment 18a on handbrake lever 18 and a second abutment associated with brake shoe 12 in the form of a plate 22 which is riveted to the shoe 12 through rivets 24 and 25. A biased wedge 21 acts between the root 20c of forked end 20b and plate 22. A return spring 29 acts between the lower ends 11c and 12c of shoes 11 and 12.

The biased wedge 21 has one edge 21a which slides down an edge 22a of plate 22 and a further edge 21b which contacts the root 20c of forked end 20b of strut 20. The wedge 21 is biased between the surface 22a and the root 20c by a wire spring 23 which encircles rivet 24 and has one end 23a engaging the wedge 21 and the other end 23b engaging a hole 26 in plate 22 or reacting against plate 22.

Figure 4:
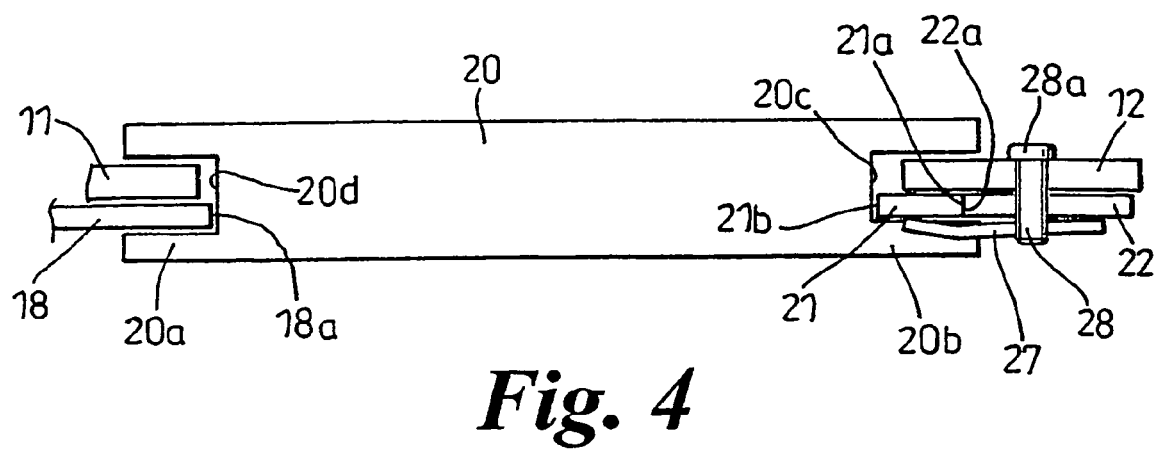
FIG. 4 shows diagrammatically further details of the clamped biased wedging arrangement of FIGS. 2 and 3.
Figure 2:
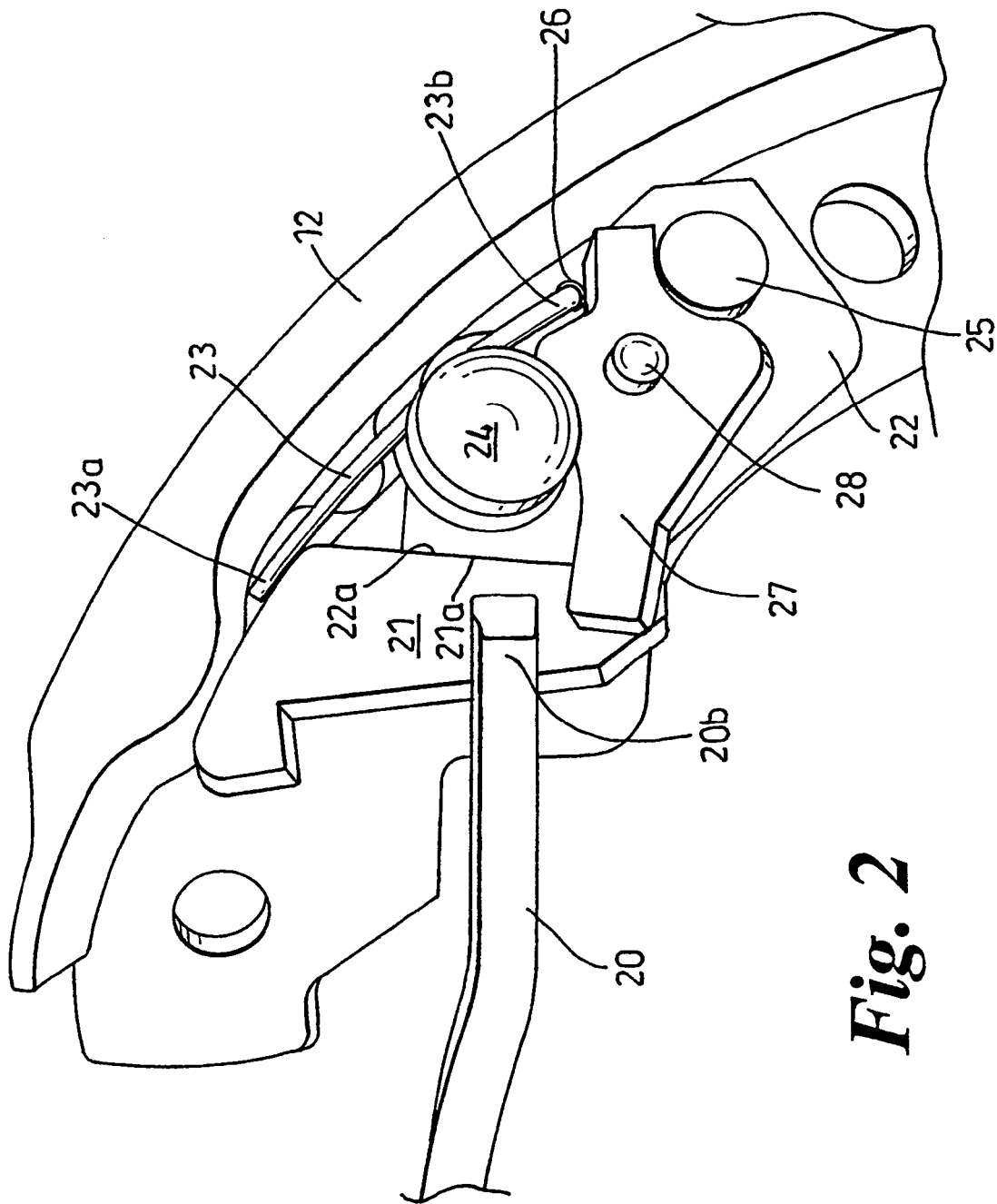
FIGS. 2 and 3 show on a larger scale the clamped biased wedging arrangement used in the parking brake of FIG. 1 in the initial brake shoes unworn condition and in a subsequent brake shoes worn condition respectively.
Figure 3:
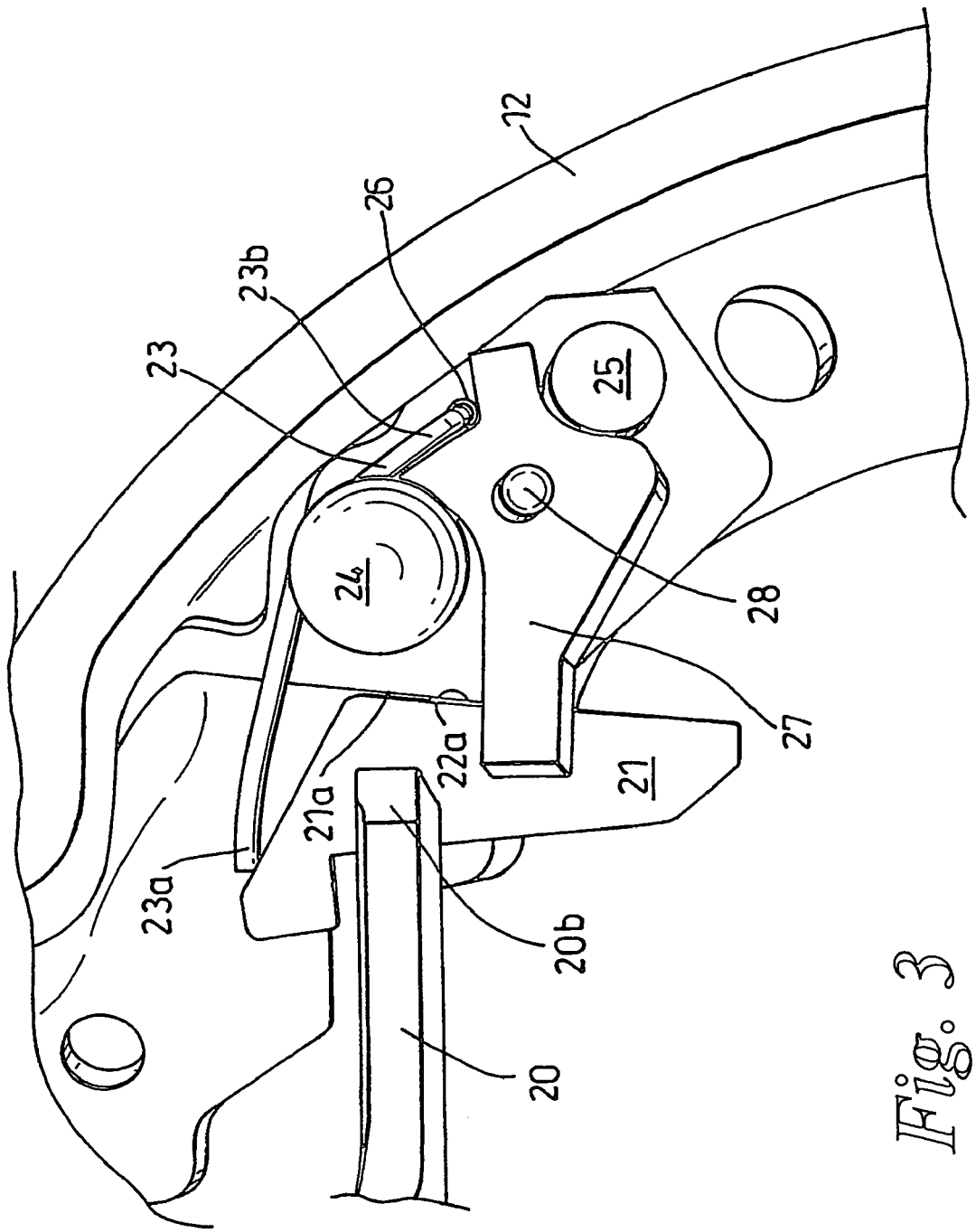

In accordance with the invention a means for disabling the operation of wedge 21 is provided in the form of a clamping plate 27 (which may be slightly arched as shown in FIG. 4) and which bears on wedge 21 and is pulled down onto wedge 21 by a nut or screw 28 having a head 28a located on the other side of brake shoe 12 as viewed in FIGS. 1 to 3. This head has a screw driver or other turning formation therein which is accessible through a hole in the brake drum (not shown) so that the screw can be slackened sufficiently to allow the wedge 21 to slide relative to strut 20 and plate 22 when it is desired for any clearance between the handbrake lever 18, strut 20 and plate 22 to be taken up and which can be tightened to prevent sliding of the wedge 21 when it is desired to prevent take-up of these clearances. The hole provided in the brake drum to give access to the head 28a of clamping screw 28 can also be positioned to give access to wear adjuster nut device 16 by rotating the drum appropriately.

Thus, if when the brake is initially assembled, the screw 28 is slack to allow the wedge 21 to slide relative to plate 22 any manufacturing or assembling clearances which may be present between the abutment surface 18a on handbrake lever 18 and the co-operating root 20d of forked end 20a of strut 20 and between the root 20c and the biased wedge 21 are automatically taken up due to the biasing effect of the wire spring 23 so that there I no lost motion in the parking brake actuating mechanism. Thus all pivoting of the handbrake lever 18 relative to the brake shoe 11 by, for example, a cable 103, 104 which is attached to the lower end 18c of handbrake lever results in immediate movement of the strut 20 and the other brake shoe 12. As explained above this is particularly advantageous if the brake is electrically actuated. FIG. 2 shows the position of the wedge 21 after this initial take-up of clearances has occurred.

After this initial taking up of the clearances by the biased wedge 21 the screw is tightened to clamp wedge 21 against shoe 12 and prevent further adjustment of clearances by wedge 21. This, as explained above, avoids problems of over adjustment which would otherwise occur should the shoes become stuck to the drum due to stiction.

If it is desired to manually adjust the shoe clearance due to wear during servicing of the vehicle etc. using adjuster 16, for example, the wedge 21 can be reactivated during the adjustment by slackening screw 28 to allow wedge 21 to slide under the action of spring 23.

It will be apparent that when adjuster 16 is operated to move the lower ends of brake shoes 11 and 12 apart to reduce the clearance of the shoes from the associated drum this will also result in the shoes moving slightly away from the ends 20a and 20b of the strut since the shoes effectively pivot on the abutment between the upper ends of the shoes. This therefore tends to increase the clearances associated with strut 20 and thus reactivation of wedge 21 helps to restore the overall efficiency of the actuating mechanism.

FIG. 3 shows the wedge 21 in a lower position relative to plate 22 after a subsequent adjustment in the clearances associated with strut 20 has taken place.

Figure 5:
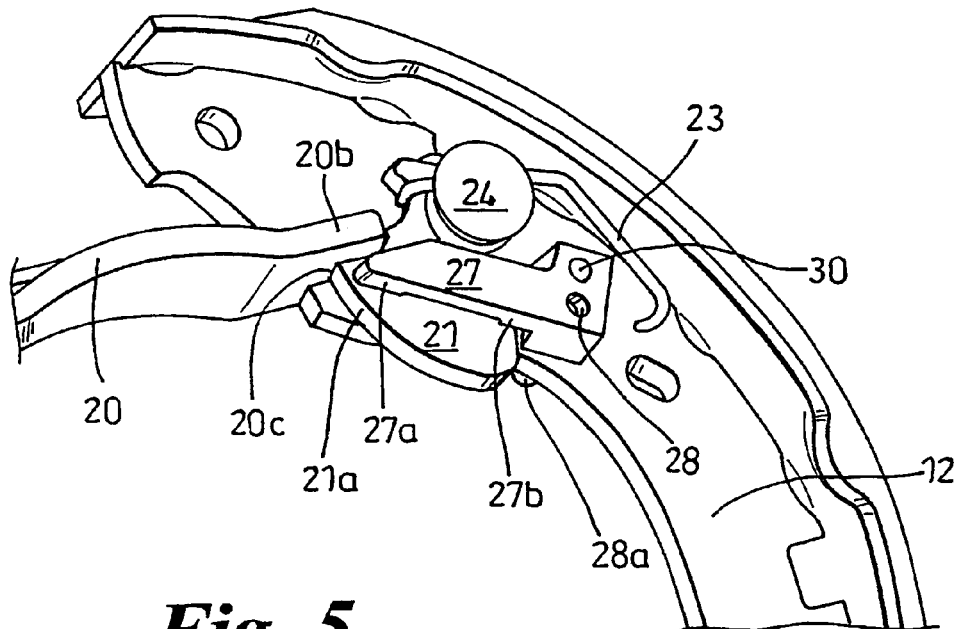
FIG. 5 shows a perspective view of part of an alternative form of parking brake in accordance with the present invention which uses a cam-type adjuster.

An alternative form of wedging means is shown in FIG. 5 in which a snail-type rotary cam 21 is pivoted on shoe 12 at 24 and has an edge 21a which is rotationally biased into contact with the root 20c of the forked end 20b of strut 20 by a wire torsion spring 23.

The cam 21 is disabled by a clamping member 27 which bears on the cam 21 at 27a and 27b and is pulled down onto the cam 21 by a screw 28 having a head 28a on the other side of brake shoe 12 as viewed in FIG. 5. The clamping member 27 is prevented from rotating relative to shoe 12 about screw 28 by a pin 30 which engage a depression in the brake shoe 12.

Operation of snail cam 21 is similar to the sliding wedge 21 with the cam being released for operation by slackening screw 28 during the initial taking up of clearances between the cam 21 and strut 20 and then locked during subsequent operation of the brake to prevent undesired adjustment. Also the screw 28 can again be slackened during servicing of the vehicle etc when manual adjustment of the shoe clearance due to wear is being undertaken to again eliminate any clearances associated with strut 20 which may have re-appeared.

Figure 6:
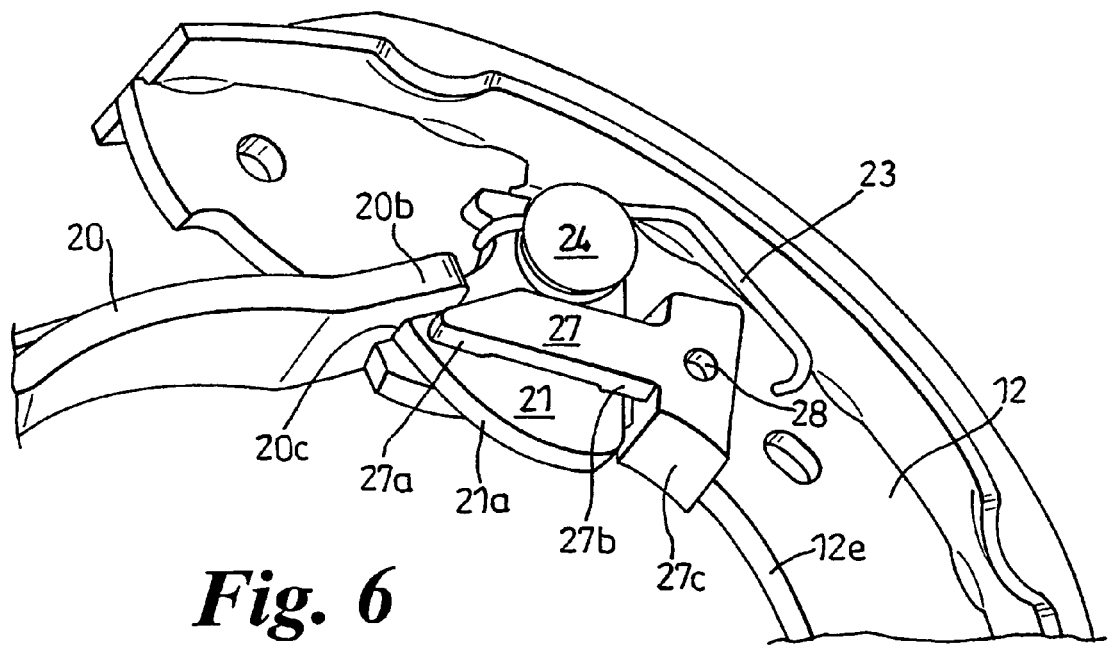
FIGS. 6 and 7 show perspective views of two further forms of cam-type adjusters.
Figure 7:
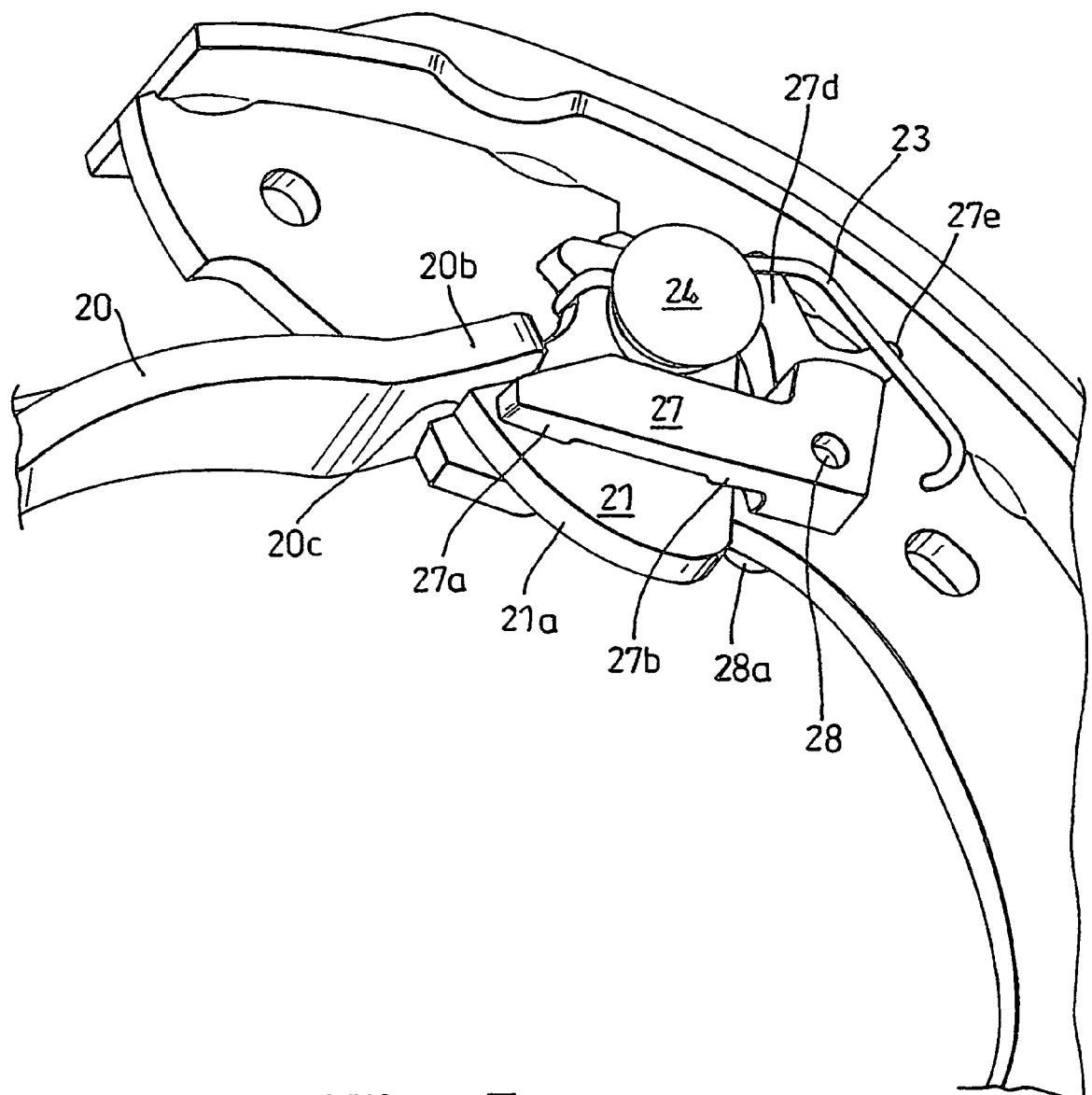

FIGS. 6 and 7 show two further variations of the form of the clamping member 27 used to disable the snail-type cam 21. In FIG. 6 the clamping member 27 is prevented from pivoting about clamping screw 28 relative to shoe 12 by a projection 27c which contacts the edged 12e of shoe 12. In the FIG. 7 arrangement two projections 27d and 27e contact the inside 12t of the table of the shoe 12 thus preventing rotation about clamping screw 28.

As indicated above the parking brake of the present invention is particularly suited for use with electric actuators.

Figure 8:
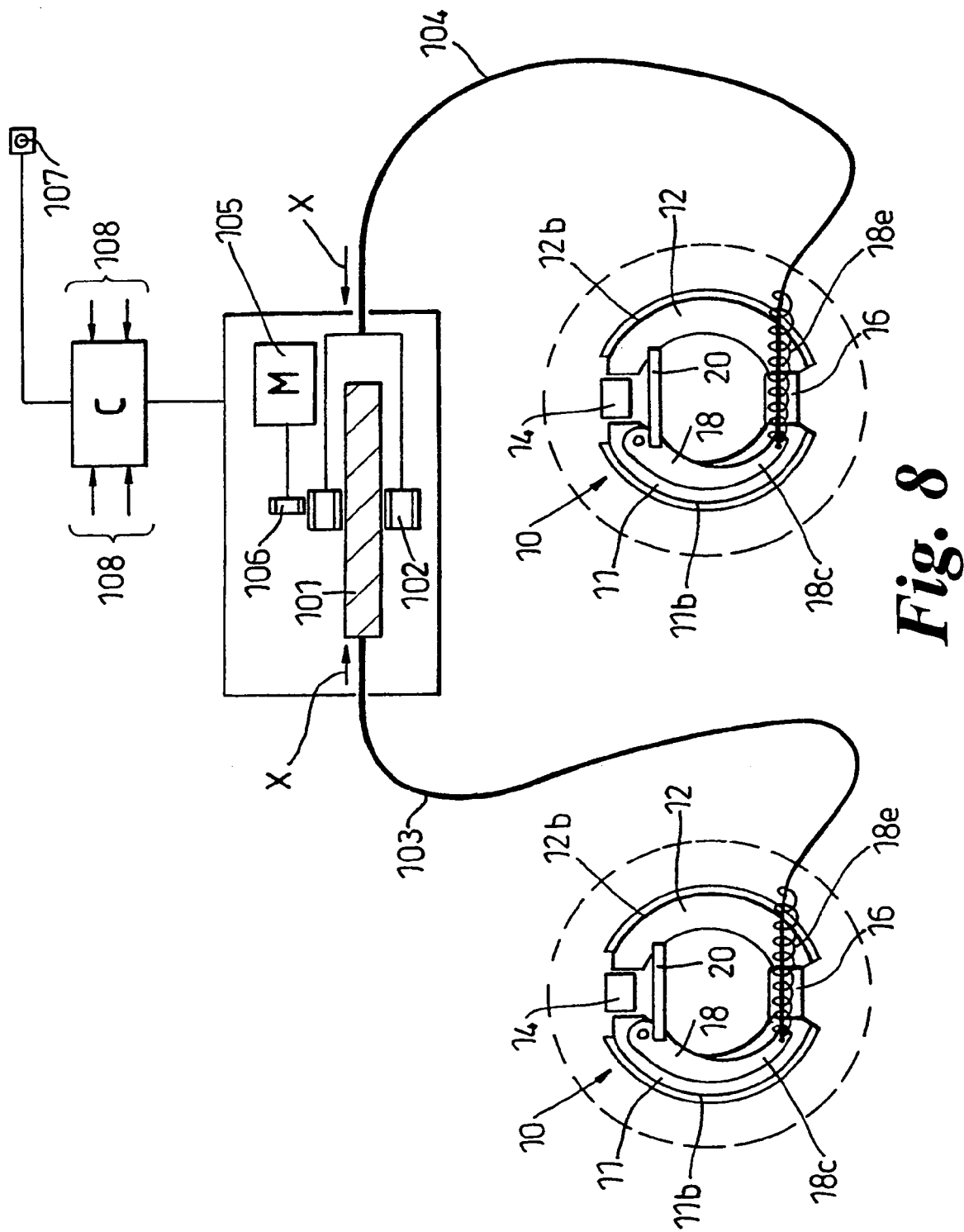
FIG. 8 is a diagrammatic representation of an electrically actuated parking brake system in accordance with the present invention.

FIG. 8 shows a parking brake system in which two drum in disc type parking brakes 10 of the form described above are operated by an electrical actuator 100 under the control of a control system C.

The electrical actuator 100 may take any suitable form and, by way of example only, the actuator 100 illustrated diagrammatically in FIG. 8 comprises a screw 101 connected with a brake operating linkage in the form of a cable 103 and a nut 102 connected with a second brake operating linkage in the form of a further cable 104.

The nut 102 can be rotated around the screw 101 by a motor 105 via a gear system 106. Thus when the motor is rotated in one direction the screw 101 is moved to the right as viewed in FIG. 8 and the nut 102 to the left in FIG. 8 this draws the two cables 103 and 104 towards the electrical actuator as indicated by arrows X in FIG. 8. Rotation of motor 105 in the opposite direction relaxes cables 103 and 104 to release the brakes. Operation of motor 105 is under the control of control unit C which receives a variety of inputs including an input from a driver operated button 107 positioned on the dashboard or at any other convenient location of the vehicle and various other sensed parameters indicated generally at 108 which the control unit uses as part of its control strategy for operating the motor 105. Since the details of the control strategy of control unit C and the constructional details of the actuator 100 do not form part of the present invention no further details will be given.

Each drum in disc parking brake 10 may include an automatic wear adjustment means 16 between the lower ends of the shoes 11 and 12 as will be described below.

The cables 103 and 104 can be attached to the lower ends 18c of handbrake levers 18 by any suitable arrangement. For example the spring-loaded pivoting latch arrangement disclosed in the Applicant's co-pending PCT application number WO 98/40640 may be employed in which the nipples 27 on cables 103 and 104 are fed into their latched positions shown in FIGS. 1 and 4 down the centre of a respective guide spring 18e which also acts as a return spring for lever 18.

Figure 9:
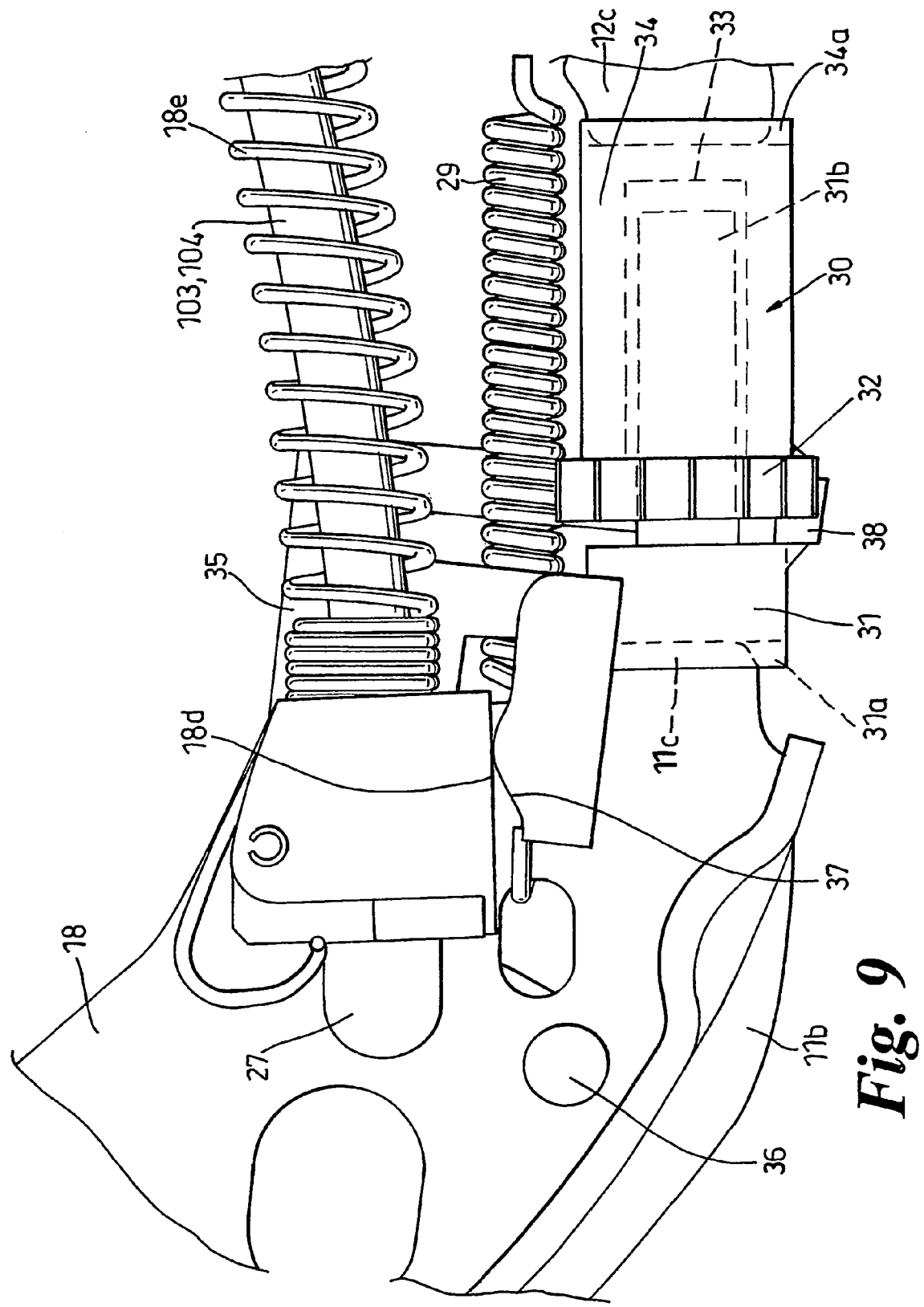
FIGS. 9 to 12 show details of an automatic adjusting device for use as part of a parking brake or parking brake system in accordance with the present invention.

The wear adjustment means 16 comprises a variable length strut 30 (see FIG. 9) in the form of a first strut member 31 having a diametrical slot 31a which receives the lower end 11c of brake shoe 11 and which has a screw threaded portion 31b which is threadably received in a toothed ratchet wheel 32. Screw threaded portion 31b of strut member 31 is received with clearance in a bore 33 of a strut member 34 which also has a diametrical slot 34a which receives the lower end 12c of shoe 12. Thus the strut members 31 and 34 are held against rotational movement relative to the shoes 11 and 12 respectively and the effective total length of the strut 30 can be varied by screwing the ratchet wheel 32 along the screw threaded portion 31b of strut member 31 since strut member 34 reacts against the right hand side of ratchet wheel 32.

Thus in order to compensate for the wear of the linings 11b and 12b of shoes 11 and 12 it is simply necessary to rotate the ratchet wheel 32 to displace the lowers ends 11c and 12c of the shoes 11 and 12 away from each other to compensate for lining wear.

Figure 10:
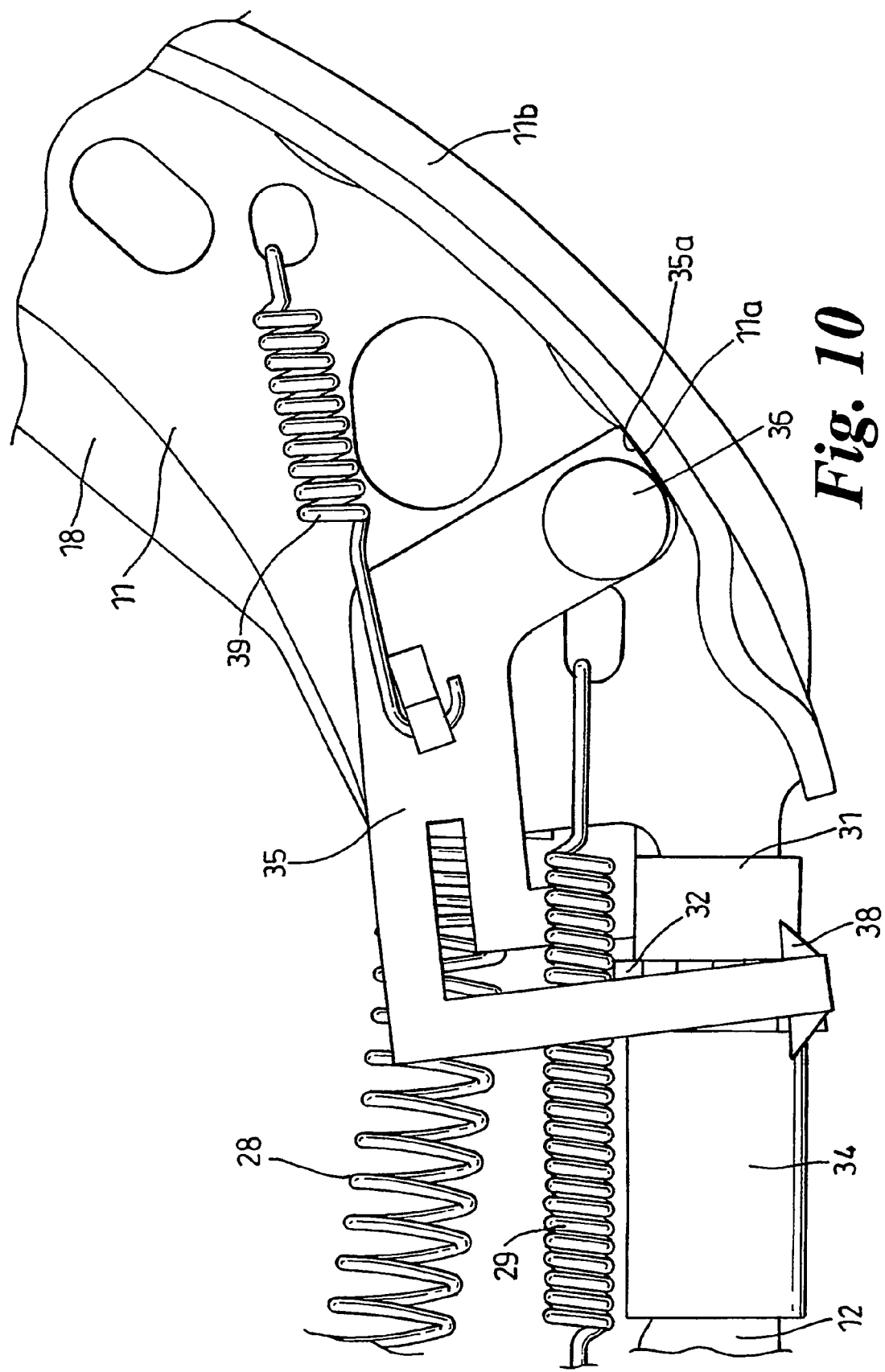
Figure 11:
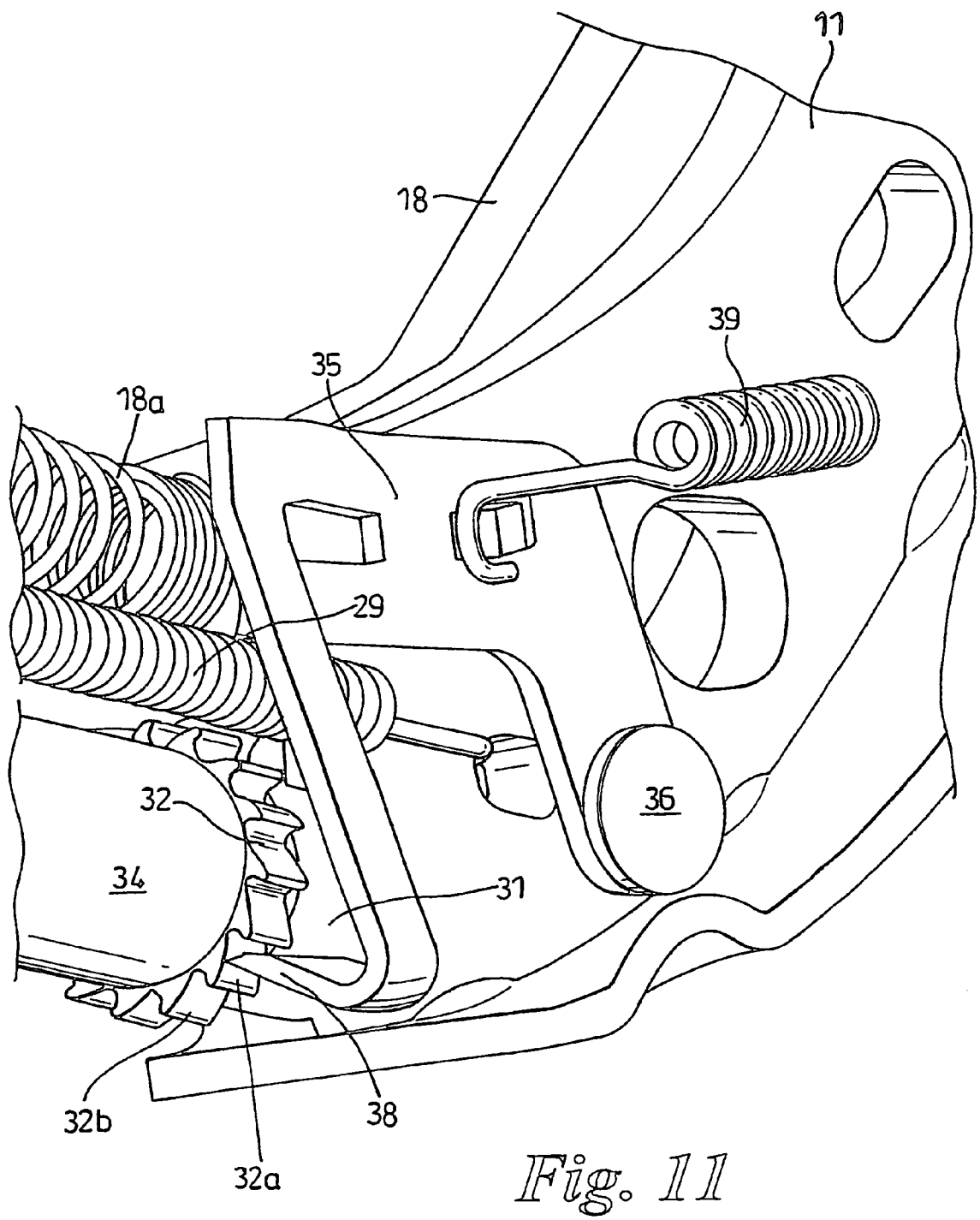

This adjustment of the effective length of the variable length strut 30 is made automatically in response to the increasing movement of handbrake lever 18 relative to shoe 11 as the shoes wear. This increased movement is sensed by an adjusting lever 35 which is pivoted on shoe 11 by rivet 36. Adjusting lever 35 includes a follower 37 which is contacted by the lower edge 18d of lever 18 when the handbrake is applied by cable 103,104 and a pawl 38 which contacts the teeth of ratchet wheel 32. As will be appreciated, as the brake linings 11b and 12b wear the movement of lever 18 necessary to apply the parking brake will increase so that the lower edge 18d of lever 18 will move further to the right as viewed in FIG. 9. This movement of the lower edge of lever 18d causes follower 37 to pivot the adjusting lever 35 about rivet 36 in a clock-wise sense (see arrow P) as viewed in FIG. 9 (counter clock-wise as viewed in FIGS. 10 and 11) to move the pawl 38 on lever 35 up and down the tooth 32a which the pawl currently engages. Each time the handbrake lever is released and the lower edge 18d moves back out of contact with follower 37 the adjusting lever 35 is pivoted back clockwise as viewed in FIGS. 10 about pivot 36 by a bias spring 39 until a stop surface 35a contacts the table 11a of shoe 11.

Figure 12:
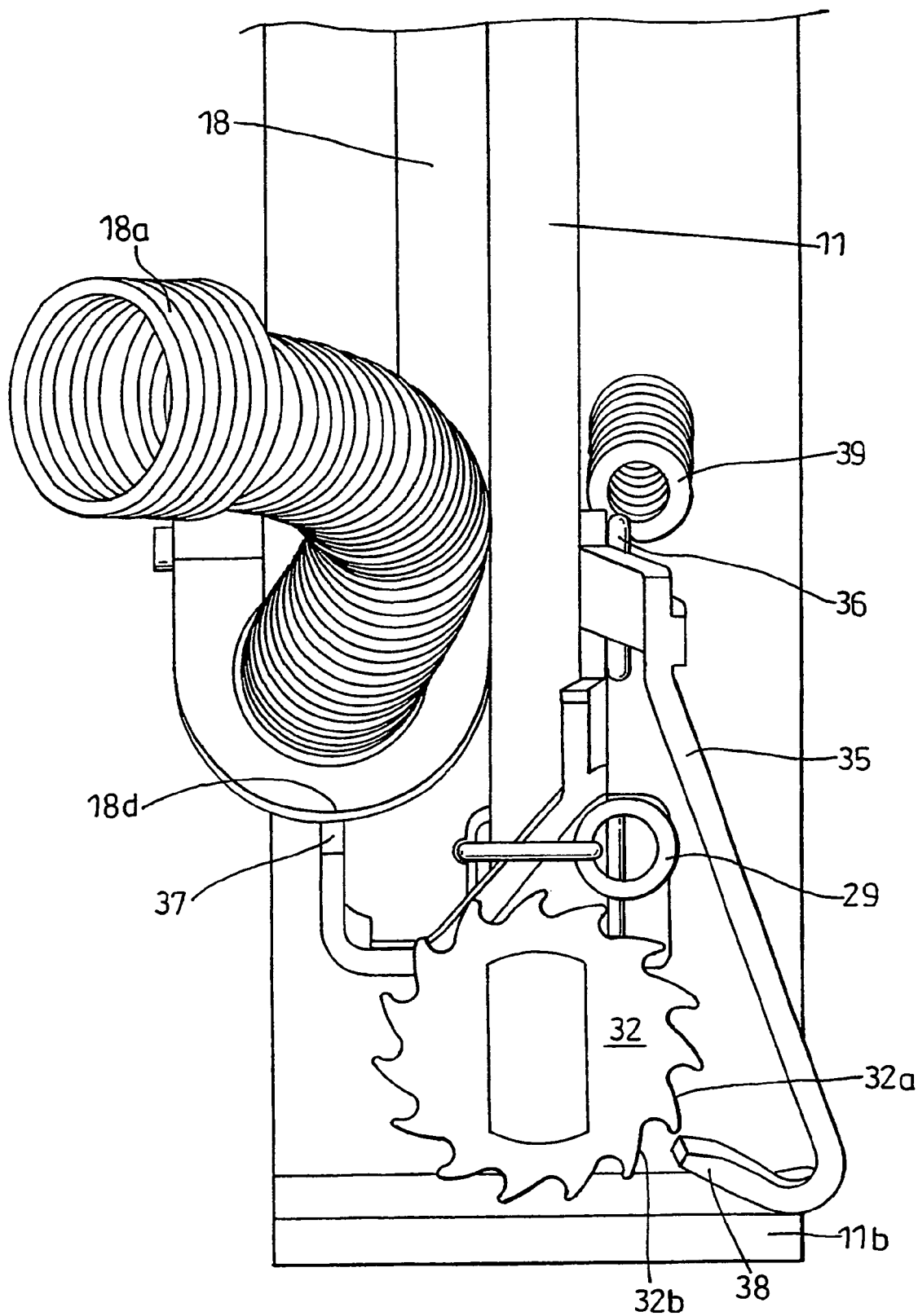

Eventually the movement the follower 37 by the lower edge 18d of lever 18 results in sufficient movement of the pawl 38 up the contacting ratchet wheel tooth 32a to cause the pawl to slide over the top of tooth 32a to engage the next tooth 32b of the ratchet wheel. FIG. 12 shows the pawl 38 about to pass over the top of tooth 32a to engage tooth 32b. On the next retraction of the lever 18 following the engagement of the new tooth 32b the bias spring 39 rotates the ratchet wheel 32 anticlockwise (as viewed in FIG. 11 or 12) thus increasing the effective length of strut 30 to adjust for the wear of the shoe linings 11b and 12b which has occurred.

As will be appreciated the above parking brake system includes a simple but effective means of continually adjusting for the wear of the linings 11b and 12b of the brake shoes. This ensures that the free travel before the brake shoes contact the associated drum 17 is kept to a minimum which is of particular advantage when the parking brake is actuated electrically, as discussed earlier, since such electrically actuation systems tend to have relatively limited travel. The wedge or cam 21 is disabled during normal operation of the parking brake function being only operative during initial taking up of clearances associated with strut 20 and during manual adjustment of clearances during servicing etc.

The parking brake 10 with its automatic wear adjuster 16 is also suitable for manual operation via, for example, a cable operated by a conventional driver operated lever and can also be used without the wedge or cam 21 when the elimination of clearances in the strut 20 is less essential.

Such an arrangement is a considerable improvement on current parking brake arrangements which require manual adjustment of the parking brake function which inevitably leads to the parking brake becoming less effective than desirable between the normal service intervals of the vehicle.

Figure 13:
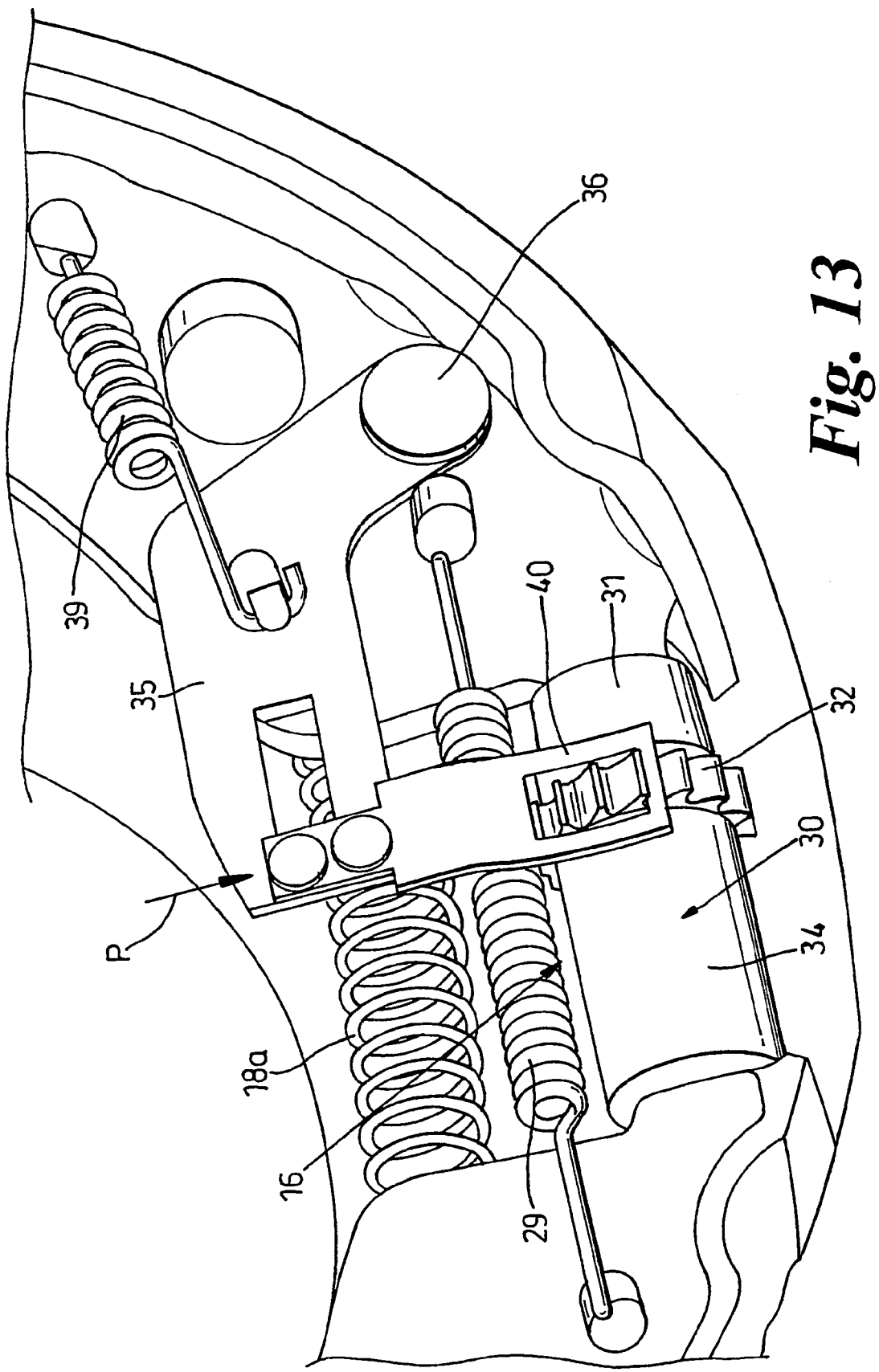
FIG. 13 shows a view generally corresponding to FIG. 10 of a modified form of automatic adjustment device which includes a bi-metallic pawl.

FIG. 13 shows a modification of the arrangement shown in FIGS. 9 to 12 in which the pawl 38 formed integrally with adjusting lever 35 is replaced by a bi-metal pawl 40 arranged so that should the general temperature of the parking brake become excessively high (which might lead to over adjustment of the clearances etc.) the bi-metal pawl will tend to bend away from the ratchet wheel teeth thus disengaging the teeth and preventing any adjustment of the effective length of strut 30 until the temperature of the brake has fallen to a level at which the bi-metal element once again engages the ratchet wheel teeth.

Figure 14:
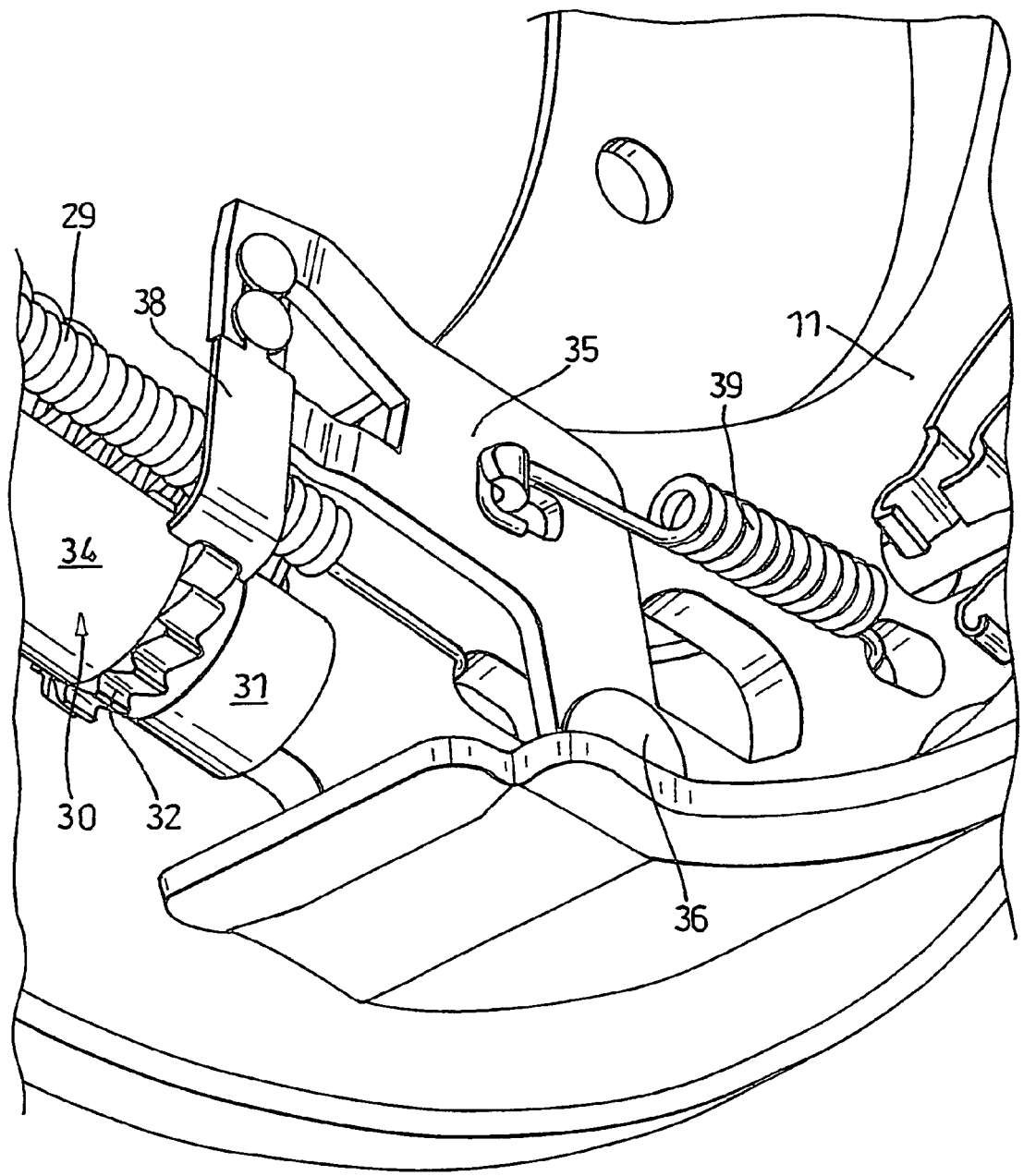
FIGS. 14 and 15 show perspective and part sectional views respectively of an alternative form of automatic adjustment device.
Figure 15:
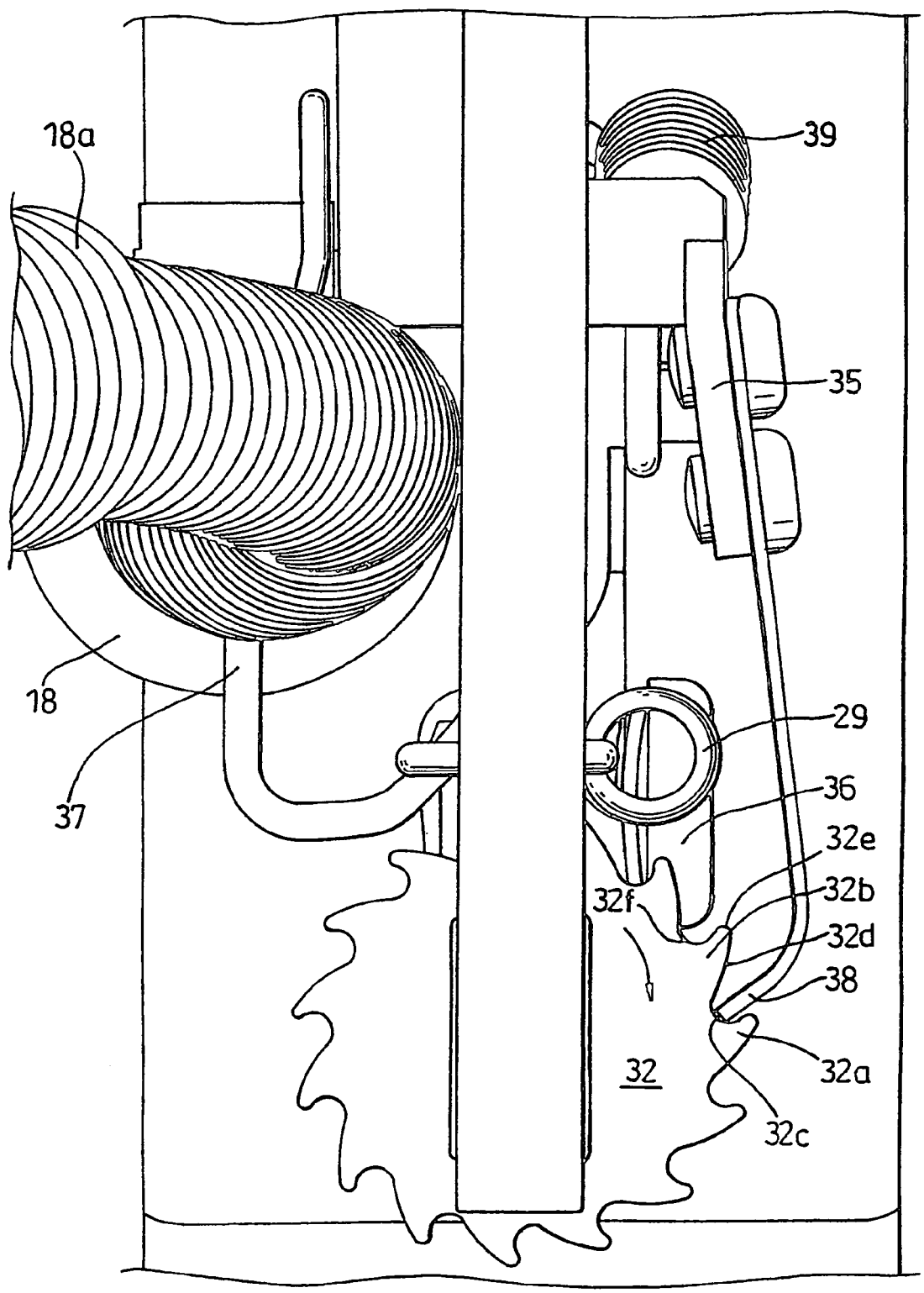

FIGS. 14 and 15 show an alternative arrangement in which instead of using the bias spring 39 to provide the motive force for rotating the ratchet wheel 32 the teeth on ratchet wheel 32 are reversed so that the movement of the handbrake lever 18 and its co-operation with the follower 37 is arranged to pivot the adjusting lever 35 anti-clockwise about the rivet 36 when viewed in FIG. 14 thus causing the end of pawl 38 to contact the root portion 32c of tooth 32a and thus rotate the ratchet wheel 32 slightly in a clockwise sense as viewed in FIGS. 14 and 15. Thus each time the lower edge 18d of handbrake lever 18 moves up follower 37 there is a tendency for the ratchet wheel 32 to be rotated slightly in a clockwise sense if any wear of the associated brake shoes has taken place. On each retraction of the handbrake lever 18 the spring 39 draws the end of pawl 38 up the ramp 32d of the next tooth 32b as the adjusting lever 35 is moved back so that its stop surface 35a contacts the table 11a of shoe 11. Eventually the clockwise rotation of the ratchet wheel resulting from and the coaction of the lower edge 18d of lever 18 and follower 37 will have rotated the ratchet wheel 32 sufficiently clockwise as viewed in FIGS. 14 and 15 so that, on retraction of the adjusting lever 35 by spring 39, the end of pawl 38 rides over the tip 32e of tooth 32b and engages the root 32f of the next tooth 32b. Thus there is a continuous small rotation of ratchet wheel 32 as the associated brake shoes 11 and 12 wear.

In the arrangement shown in FIGS. 14 and 15 the pawl 38 is of a bi-metallic construction, similar to that shown in FIG. 13, which is riveted to the adjusting lever 35 and which will disengage the teeth of ratchet wheel 32 if the temperature of the parking brake becomes excessive in order to prevent over adjustment of the effective length of strut 30.

As will be appreciated, the inclination of the lower edge 18d of lever 18 which is contacted by follower 37 may be varied to adjust the amount of pivoting of adjusting lever 35 corresponding to a given amount of movement of lever 18. Also, the follower 37 could be replaced by a cam formation on plate 35 for co-operation with lever 18 to again produce a particular relationship between the pivoting of adjusting lever 35 and handbrake lever 18.

FIGS. 16 to 20 show an alternative form of automatically adjusting parking brake in accordance with the present invention which uses an expanding lever actuating mechanism 200 similar to that described in the Applicant's co-pending published PCT patent application No. WO 01/21976A1 and the Applicant's earlier UK patent application No. 02 03894.1.

This expander mechanism 200 is positioned between the upper ends of brake shoes 11 and 12 and comprises a first lever 211 having a first contact zone 212 for engagement with a web of an associated brake shoe 11 and a second lever 215 having a second contact zone 216 for engagement with the web of a second brake shoe 12. The two levers 211 and 215 are pivotally interconnected at 219 so that, in conventional manner, pivoting of first lever in direction P1 results in an increase in the distance between the first and second contact zones 212 and 216 to force the brake shoe 11 and 12 apart causing them to engage with an associated drum in disc 10a. As is conventional, the brake includes return springs 220 and 29 which act between the shoes and an automatic adjustment device 16 generally of the form described above in relation to FIGS. 9 to 12, or 13, or 14 and 15 is located between the lower ends 11c and 12c of the brake shoes.

Figure 19:
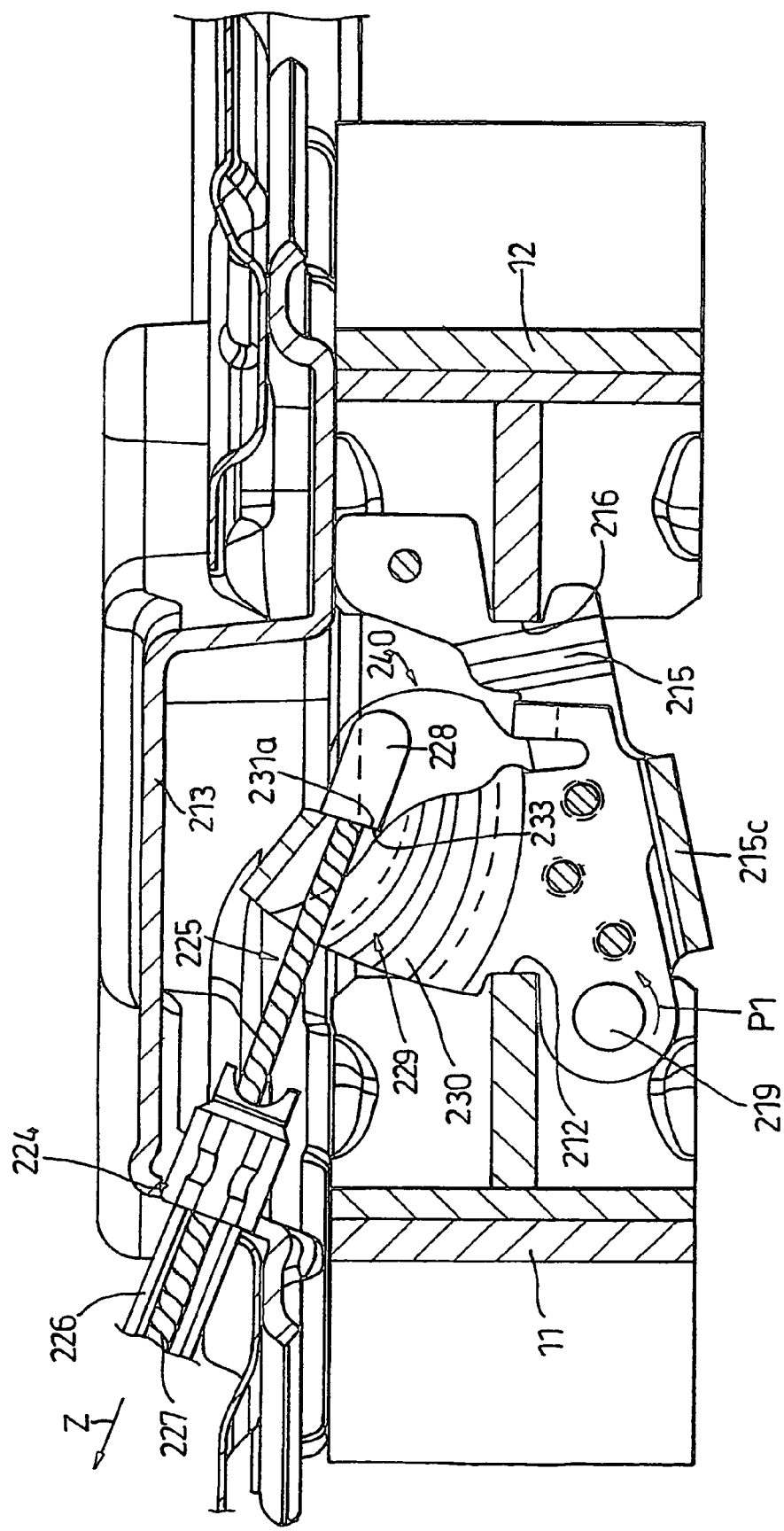
Figure 20:
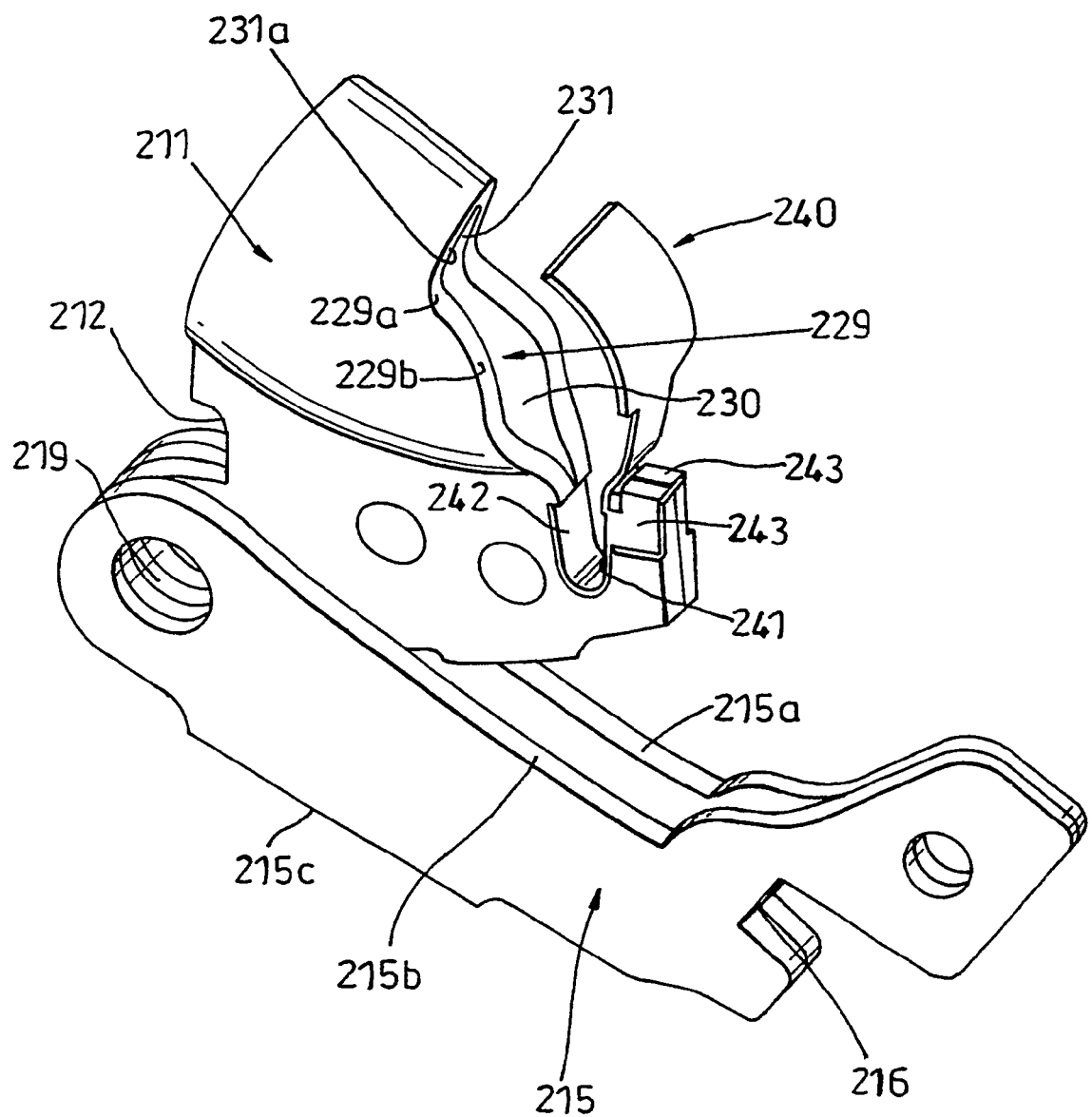

The shoes 11 and 12 are mounted on a back plate 213 which includes an aperture 224 through which a parking brake actuating cable 225 extends. The cable has an outer sheath 226 which is gripped in aperture 224 and an inner member 227 whose free end terminates in a nipple 228. As can be seen from FIGS. 18 to 20, first lever 211 is of hollow pressed metal form and includes a longitudinally extending passage 229 whose cross section includes a wider portion 230 (see FIG. 20) through which the nipple 228 can pass and a narrower portion 231 through which the nipple cannot pass. As shown in FIG. 19, the inner 227 of the cable can be threaded through the wider portion 230 of passage 229.

A leaf spring 240 is mounted on lever 211 in a notch 241 by clip portion 242 and tabs 243. Spring 240 includes a cam portion 244 which is contacted by the nipple 228 as the nipple emerges from the passage 229 and which tends to deflect the nipple 228 towards a fully installed position shown in FIG. 19 in which a shoulder 233 of nipple 228 contacts an end 231a of the narrow portion 231 of passage 229 when the cable inner 227 is drawn in direction Z of FIG. 20 so that the first lever 211 is pivoted in direction P1 and hence the actuating mechanism is operated. End 231a of narrow passage portion 231 forms the abutment formation of lever 211.

Figure 16:
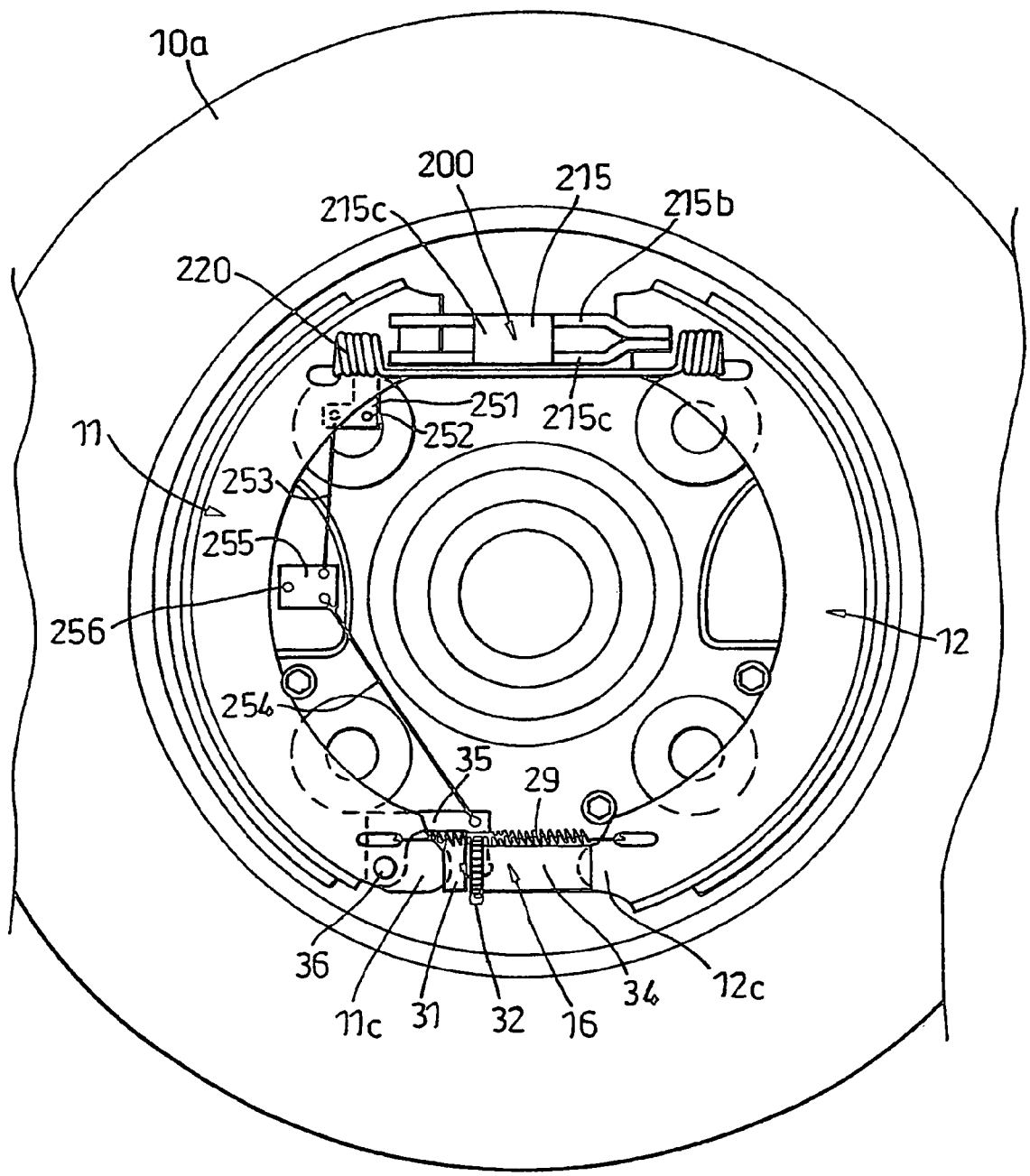
FIGS. 16 to 20 show details of a further form of drum in disc type parking brake in accordance with the invention which is also suitable for use in the system of FIG. 8.
Figure 17:
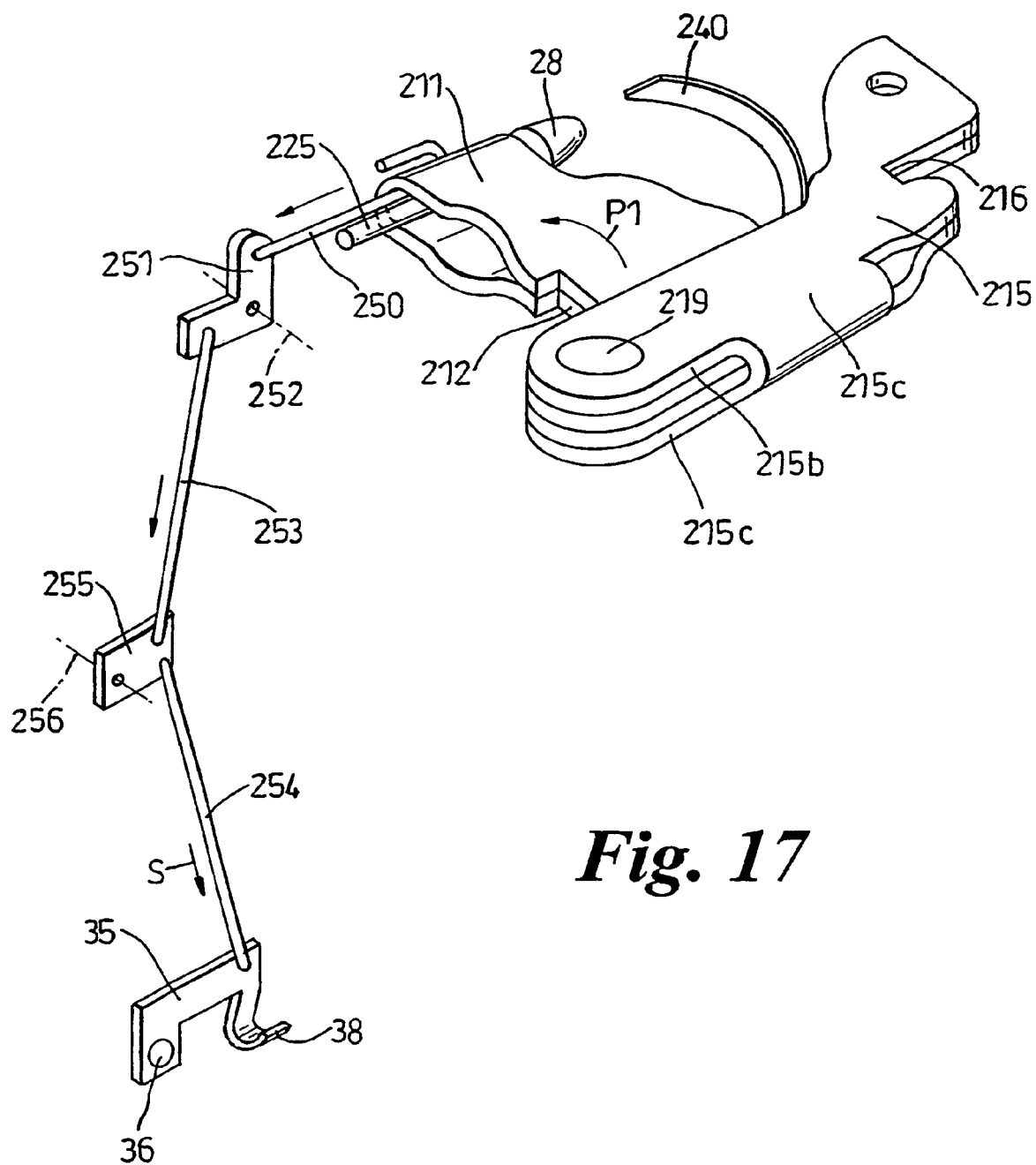
Figure 18:
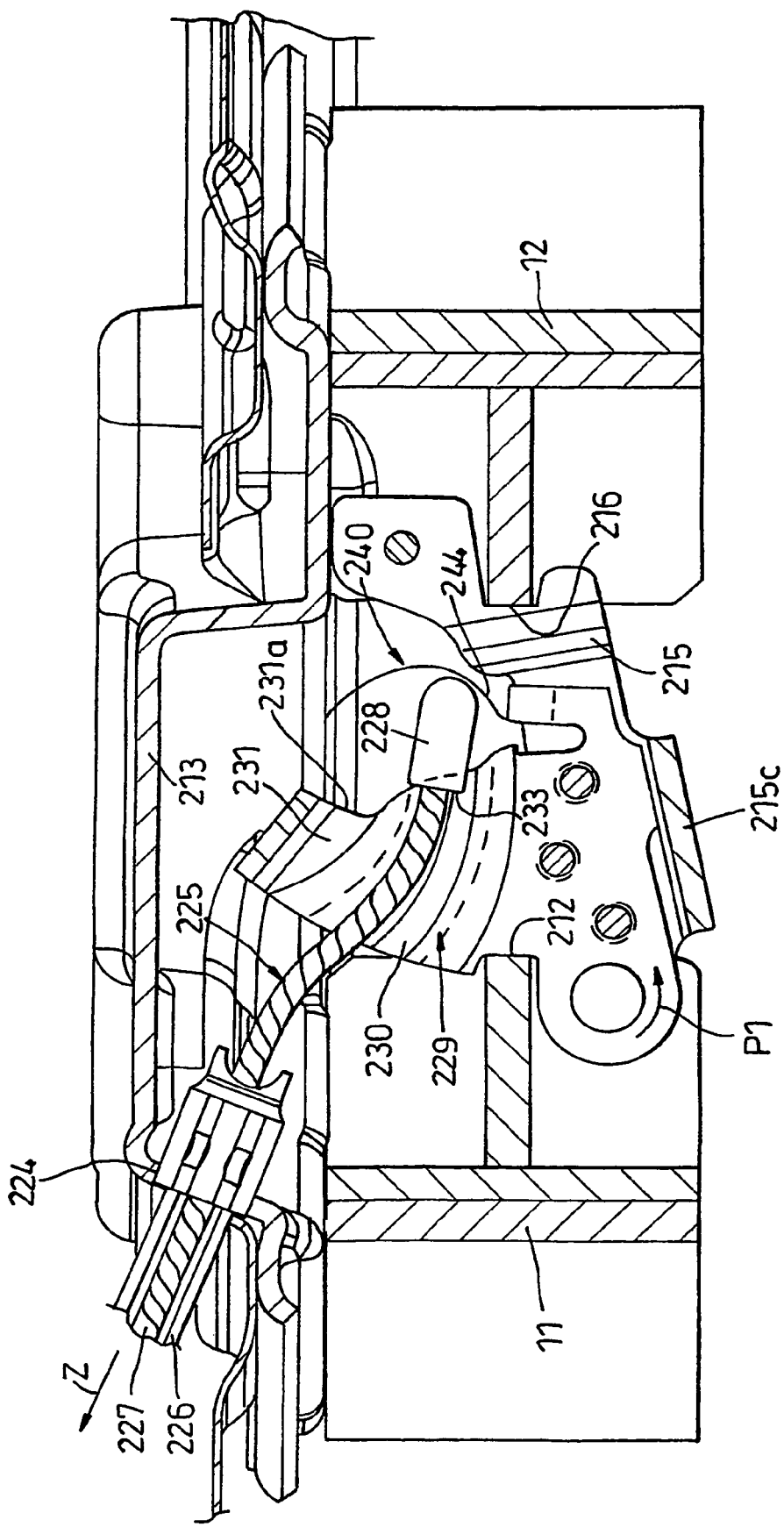

The expander mechanism 200 is connected with the automatic adjustment device 16 by a link and bell crank arrangement shown in FIGS. 16 and 17. This link and bell crank arrangement which comprises link 250 directly connected with lever 211, bell crank 251 pivoted on the brake backplate about an axis 252, further links 253 and 254 and an intermediate connecting bell crank 255 which is again pivoted on a brake backplate about an axis 256. The final link 254 is connected with adjusting lever 35 so that pivoting of lever 211 in direction P1 is translated into downward movement of adjusting lever 35 as indicated by arrow S in FIG. 17.

Thus when the pivotal movement P1 of lever 211 exceeds a pre-determined amount there is sufficient vertical movement S of adjusting lever 35 to ride over onto the next tooth 32b on ratchet wheel 32. Thus again the wear of linings 11b and 12b of shoes 11 and 12 is automatically adjusted when the movement of the handbrake actuating mechanism necessary to apply the handbrake exceeds a pre-determined distance.

The automatically adjusting parking brake described in FIGS. 16 to 20 may be manually actuated by cable 225 or this cable may be electrically operated when the parking brake described in FIGS. 16 to 20 is used as part of a parking brake system as shown in FIG. 8.

The automatically adjusting parking brake concept of the present invention in which movement of the parking brake actuating mechanism beyond a pre-determined distance is used to effect adjustment of the brake shoe clearance may be implemented by locating both the handbrake actuating mechanism and the automatic wear adjuster at the same end of the brake shoe of shoes.

Figure 21:
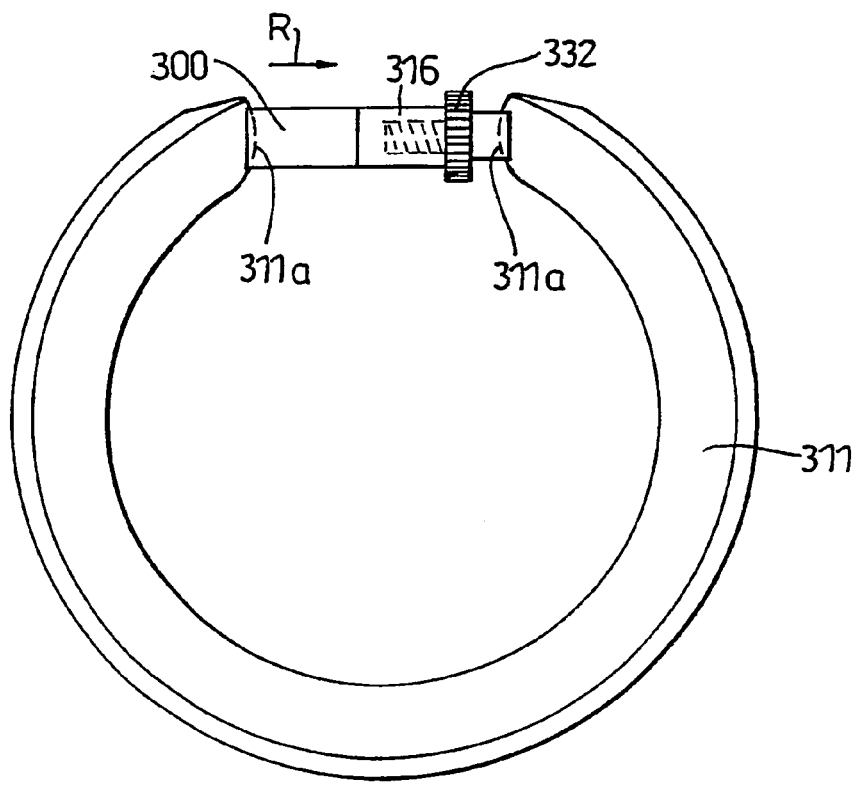
FIG. 21 shows diagrammatically the present invention applied to a single shoe brake.

Thus, for example, as shown diagrammatically in FIG. 21 in a single shoe drum brake of the type, for example, disclosed in EP 392829A1 and WO99/53212 both the parking brake actuating mechanism 300 and the automatic wear adjuster 316 may be located between the free ends 311a of a single curved generally U-shaped brake shoe 311.

Figure 22:
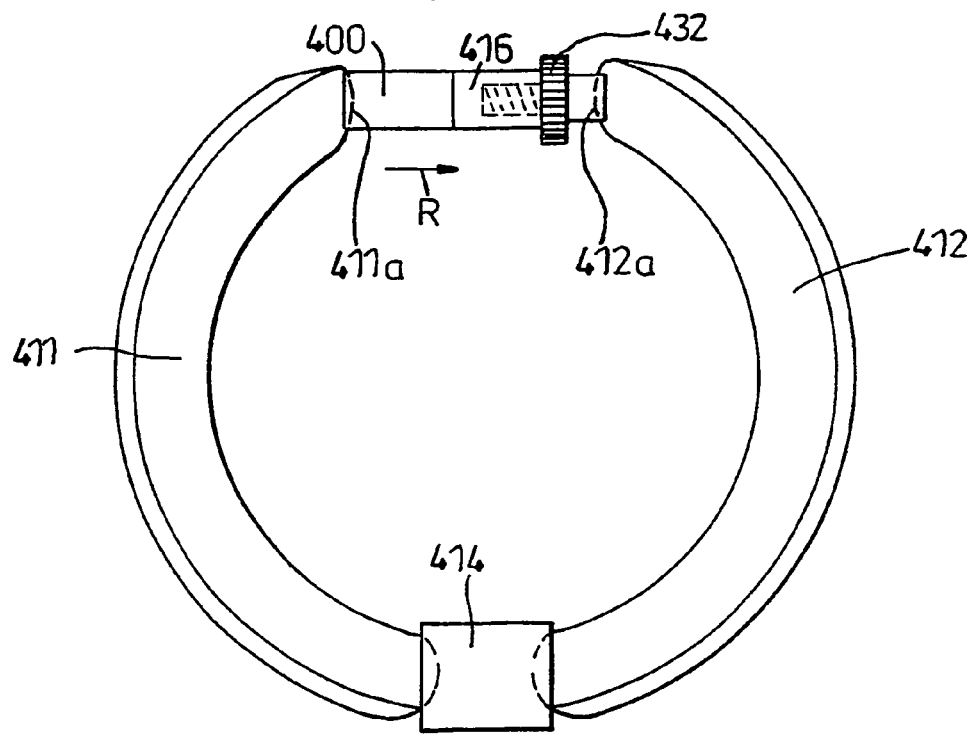
FIG. 22 shows diagrammatically the parking brake actuating mechanism and automatic adjustment device of the present invention located between the same ends of a pair of brake shoes.

Similarly, as shown diagrammatically in FIG. 22, in a two shoe brake with a fixed or floating abutment 414 located between the lower ends of brakes shoes 411 and 412 the parking brake actuating mechanism 400 and automatic wear adjuster 416 may be located between the upper ends 411a and 412a of the shoes.

In both of the arrangements described above in relation to FIGS. 21 and 22 movement, for example, of part of the parking brake actuating mechanism in direction R could be used to pivot an adjuster lever similar to adjuster lever 35 described above in relation to FIGS. 9 to 12 to move a pawl similar to pawl 38 to rotate a ratchet wheel 332 or 432 respectively.

Thus the present invention provides an electrically actuated drum type parking brake in which operation of a parking brake actuating mechanism is used to automatically adjust the shoe clearance of the parking brake when a given amount of movement of the actuating mechanism occurs before the shoes are applied. The invention is particularly, although not exclusively, applicable to drum in disc parking brakes.

What is claimed is:

1. A parking brake comprising a drum containing first and second brake shoe portions, a handbrake lever pivoted adjacent one end on one of the brake shoe portions and a strut extending between a first abutment on the handbrake lever and a second abutment on the other of the brake shoe portions so that pivoting of the handbrake lever relative to said one brake shoe portion moves the strut which in turn moves the other brake shoe portion away from said one brake shoe portion to bring the shoe portions into contact with the drum thus applying the parking brake, one of the abutments comprising a biased wedging means which acts on the strut to take up all play in the thrust path between the handbrake lever and the other brake shoe portion via the strut, means being provided for disabling the wedging means from operating except when initial manufacturing or assembly clearances are being taken up in the strut or when a subsequent manual adjustment of shoe clearance is being made, wherein the biased wedging means comprises a cam rotationally biased against one end of the strut by a spring means.

2. A brake according to claim 1 in which the first and second brake shoe portions are provided by separate brake shoes.

3. A brake according to claim 1 in which the first and second brake shoe portions are provided by opposite end portions of a single generally U-shaped brake shoe.

4. A brake according to claim 2 in which the ends of the brake shoes remote from the strut pivot on a brake shoe clearance adjustment device are positioned between the ends of the shoes and in which the biased wedging means is a sliding wedge.

5. A brake according to claim 4 in which the adjustment device operates automatically when a given amount of movement of the hand brake lever occurs before the brake is applied.

6. A brake comprising a drum containing first and second brake shoe portions, a handbrake lever pivoted adjacent one end on one of the brake shoe portions and a strut extending between a first abutment on the handbrake lever and a second abutment on the other of the brake shoe portions so that pivoting of the handbrake lever relative to said one brake shoe portion moves the strut which in turn moves the other brake shoe portion away from said one brake shoe portion to bring the shoe portions into contact with the drum thus applying the parking brake, one of the abutments comprising a biased wedging means which acts on the strut to take up all play in the thrust path between the handbrake lever and the other brake shoe portion via the strut, means being provided for disabling the wedging means from operating except when initial manufacturing or assembly clearances are being taken up in the strut or when a subsequent manual adjustment of shoe clearance is being made, wherein the means for disabling the wedging means comprises a releasable clamping means which prevents movement of the biased wedging means relative to the co-operating abutment, and wherein the clamping means comprises a clamping member which is drawn down onto the biased wedging means or a cam by a screw or bolt to clamp the wedging means or the cam to the web of the other brake shoe portion to prevent adjustment of the clearances.

7. A brake comprising a drum containing first and second brake shoe portions, a handbrake lever pivoted adjacent one end on one of the brake shoe portions and a strut extending between a first abutment on the handbrake lever and a second abutment on the other of the brake shoe portions so that pivoting of the handbrake lever relative to said one brake shoe portion moves the strut which in turn moves the other brake shoe portion away from said one brake shoe portion to bring the shoe portions into contact with the drum thus applying the parking brake, one of the abutments comprising a biased wedging means which acts on the strut to take up all play in the thrust path between the handbrake lever and the other brake shoe portion via the strut, means being provided for disabling the wedging means from operating except when initial manufacturing or assembly clearances are being taken up in the strut or when a subsequent manual adjustment of shoe clearance is being made, wherein the brake is of the drum in disc type.

8. A brake according to claim 7 in which the biased wedging means is a sliding wedge.

9. A brake according to claim 8 in which the wedge slides along a plate secured to a web of the other brake shoe portion, a further edge of the wedge sliding along a further abutment surface on the strut.

10. A brake according to claim 9 in which the further abutment surface on the strut comprises the root of a forked end portion of the strut, the forked end having two prongs which extend on opposite sides of the web of the other brake shoe portion.

* * * * *